(12) United States Patent
Maekubo et al.

(10) Patent No.: US 9,090,229 B2
(45) Date of Patent: Jul. 28, 2015

(54) WEBBING TAKE-UP DEVICE

(71) Applicant: KABUSHIKI KAISHA
TOKAI-RIKA-DENKI-SEISAKUSHO,
Aichi-ken (JP)

(72) Inventors: Yoshiaki Maekubo, Aichi-ken (JP);
Masaru Ukita, Aichi-ken (JP); Wataru
Yanagawa, Aichi-ken (JP); Takayoshi
Ando, Aichi-ken (JP)

(73) Assignee: KABUSHIKI KAISHA
TOKAI-RIKA-DENKI-SEISAKUSHO,
Aichi-Ken (JP)

( * ) Notice: Subject to any disclaimer, the term of this
patent is extended or adjusted under 35
U.S.C. 154(b) by 222 days.

(21) Appl. No.: 13/854,539

(22) Filed: Apr. 1, 2013

(65) Prior Publication Data
US 2013/0256440 A1 Oct. 3, 2013

(30) Foreign Application Priority Data
Apr. 3, 2012 (JP) ................................. 2012-084666

(51) Int. Cl.
B60R 22/46 (2006.01)
(52) U.S. Cl.
CPC ......... B60R 22/4628 (2013.01); B60R 22/4633
(2013.01)

(58) Field of Classification Search
CPC ............................................... B60R 2022/3402
USPC ...................... 242/374; 60/635, 636; 137/613
See application file for complete search history.

(56) References Cited

U.S. PATENT DOCUMENTS

| 6,616,081 | B1 | 9/2003 | Clute | |
|---|---|---|---|---|
| 8,459,583 | B2 * | 6/2013 | Ogawa | 242/374 |
| 2012/0024404 | A1 * | 2/2012 | Maekubo et al. | 137/613 |
| 2012/0032018 | A1 * | 2/2012 | Maekubo et al. | 242/374 |

FOREIGN PATENT DOCUMENTS

JP        2003502204 A       1/2003

* cited by examiner

Primary Examiner — Sang Kim
(74) Attorney, Agent, or Firm — Roberts Mlotkowski Safran
& Cole P.C.

(57) ABSTRACT

A webbing take-up device is obtained capable of securing sealing properties to gas generated by actuation of a gas generator. A switching mechanism of a webbing take-up device is equipped with a body, a gas generator, a piston that is actuated on receipt of pressure of gas generated by the gas generator, and a cylinder that internally houses the piston. A sheet and a support plate are attached to the body. Crushable ribs are provided to the sheet. The crushable ribs press the cylinder through a general portion of the sheet by attaching the sheet and the support plate to the body.

6 Claims, 10 Drawing Sheets

WEBBING TAKE-UP DEVICE

CROSS-REFERENCE TO RELATED APPLICATION

This application claims priority under 35 USC 119 from Japanese Patent Application No. 2012-084666 filed Apr. 3, 2012, the disclosure of which is incorporated by reference herein.

BACKGROUND OF THE INVENTION

1. Field of the Invention

The present invention relates to a webbing take-up device that permits a spool to rotate in a pull-out direction at a force limiter load or greater when a vehicle decelerates suddenly and the spool is rotated suddenly in the pull-out direction.

2. Related Art

A webbing take-up device is known that a force limiter load is switched by actuating a cylinder and a piston mechanism with using of pressure of gas generated by actuating a gas generator (see for example Japanese National Phase-Publication No. 2003-502204).

However, there is a desire for further enhancement to gas sealing properties in a webbing take-up device that performs force limiter load switching utilizing pressure of gas generated by actuating a gas generator.

SUMMARY OF THE INVENTION

In consideration of the above circumstances, an object of the present invention is to obtain a webbing take-up device capable of enhancing the sealing properties to gas generated by actuating a gas generator.

A webbing take-up device according to a first aspect of the present invention includes: a spool that takes up webbing which is applied to an occupant, and that rotates in a pull-out direction by pulling out the webbing; a lock section that restricts rotation of the spool in the pull-out direction at least one of at a time when a vehicle suddenly decelerates or a time when the spool is rotated suddenly in the pull-out direction; a force limiter mechanism that, when the lock section restricts rotation of the spool in the pull-out direction, permits rotation of the spool in the pull-out direction at a force limiter load or greater; a pawl that is configured to be capable of being disposed in a first position and a second position so as to switch a load value of the force limiter load; a body that includes a flow path through which a gas generated by actuation of a gas generator flows; a cylinder that is connected to the flow path of the body; a piston that is housed inside the cylinder, and that moves along the cylinder by receiving a pressure of the gas to move the pawl from the first position to the second position; a sheet that is disposed at an opposite side of the cylinder with respect to the body (and disposed at a lateral side of the cylinder), and that covers the cylinder by being attached to the body; a support plate that is attached to the body in a state in which the cylinder and the sheet are disposed between the support plate and the body; and a rib that is provided between the sheet and the support plate and is provided at an opposite side of the sheet with respect to the cylinder, and that presses the cylinder via the sheet towards the body side due to the support plate being attached to the body.

In the first aspect of the present invention, gas flows into the cylinder through the flow path provided to the body when gas at high pressure is generated from the gas generator. The internal pressure of the cylinder consequently rises. When this occurs, the piston moves along the cylinder, and moves the pawl from the first position to the second position. The load value of the force limiter load is switched as a result. The cylinder attempts to move in the direction away from the body due to the pressure of the gas when the gas generated from the gas generator flows into the cylinder. However, in the present invention, due to the support plate being attached to the body, the sheet is pressed by the rib and the cylinder is pressed through the sheet towards the body side. Namely, in the present invention, the rib prevents the connection between the flow path provided to the body and the cylinder from coming apart.

A webbing take-up device according to a second aspect of the present invention is the webbing take-up device of the first aspect wherein the cylinder is disposed inside a housing groove provided at the body; and the rib is provided at an inner side of an opening edge portion of the housing groove in a plan view.

In the second aspect of the present invention, with the support plate being attached to the body, the sheet is pressed by the rib, and the sheet is placed in close contact with the opening edge portion of the housing groove. As a result, for example, even though gas generated from the gas generator leaks out between the flow path provided to the body and the cylinder, the leaked gas is prevented from flowing out from between the sheet and the opening edge portion of the housing groove.

A webbing take-up device according to a third aspect of the present invention is the webbing take-up device of the first aspect or the second aspect wherein a member at which the rib is provided is formed with a receiving surface that receives a pressing force of the cylinder which attempts to move by receiving the pressure of the gas; and the rib is disposed inside an indentation portion which is provided so as to indent with respect to the receiving surface.

In the third aspect of the present invention, it is conceivable that the rib provided between the sheet and the support plate is deformed so as to be crushed when the cylinder attempts to move in the direction away from the body due to the gas generated from the gas generator flowing into the cylinder. However, in the present invention, the receiving surface is formed to receive the pressing force of the cylinder attempting to move on receipt of gas pressure. The rib is disposed inside the indentation (recess portion) which is provided so as to indent (so as to be recessed) with respect to the receiving surface. It is thus possible to support the pressing force of the cylinder with the receiving surface even when the rib is crushed at the portion projecting out from the indentation.

A webbing take-up device according to a fourth aspect of the present invention is the webbing take-up device of any one of the first aspect to the third aspect, wherein a member at which the rib is provided is formed with a receiving surface that receives a pressing force of the cylinder which attempts to move by receiving the pressure of the gas; and the rib is disposed inside an indentation portion which is provided so as to indent with respect to the receiving surface.

In the fourth aspect of the present invention, the rib is integrally formed to the sheet. The number of components is accordingly reduced compared to a case in which the rib of a separate member is provided, and therefore a reduction in the number of assembly processes for the webbing take-up device can also be achieved. Moreover, in the present invention, a portion of the rib is deformed by attaching the support plate to the body. It is accordingly possible to support the pressing force of the cylinder attempting to move on receipt of gas pressure by the resilient force of the deformed portion of the rib attempting to resiliently rebound.

In the first aspect, it is possible that a tip end portion of the rib protrudes towards the support plate side, and the deformed tip end portion of the rib abuts the support plate in a state in which the support plate is attached to the body.

Further, it is possible that the indentation portion indents towards the cylinder side, a base end portion of the rib is provided at a bottom face of the indentation portion, and the tip end portion of the rib is protruded towards the support plate side further than an opening of the indentation portion.

The webbing take-up device according to the first aspect of the present invention accordingly exhibits the excellent advantageous effect of enabling the sealing properties to gas generated by actuation of a gas generator to be enhanced.

The webbing take-up devices according to the second aspect to the fourth aspect of the present invention exhibit the excellent advantageous effect of enabling the sealing properties to gas generated by actuation of a gas generator to be further enhanced.

BRIEF DESCRIPTION OF THE DRAWINGS

Exemplary embodiments of the present invention will be described in detail with reference to the following figures, wherein.

DETAILED DESCRIPTION OF THE INVENTION

Explanation follows regarding a webbing take-up device according to an exemplary embodiment of the present invention, with reference to FIG. 1 to FIG. 10.

Figure 1:
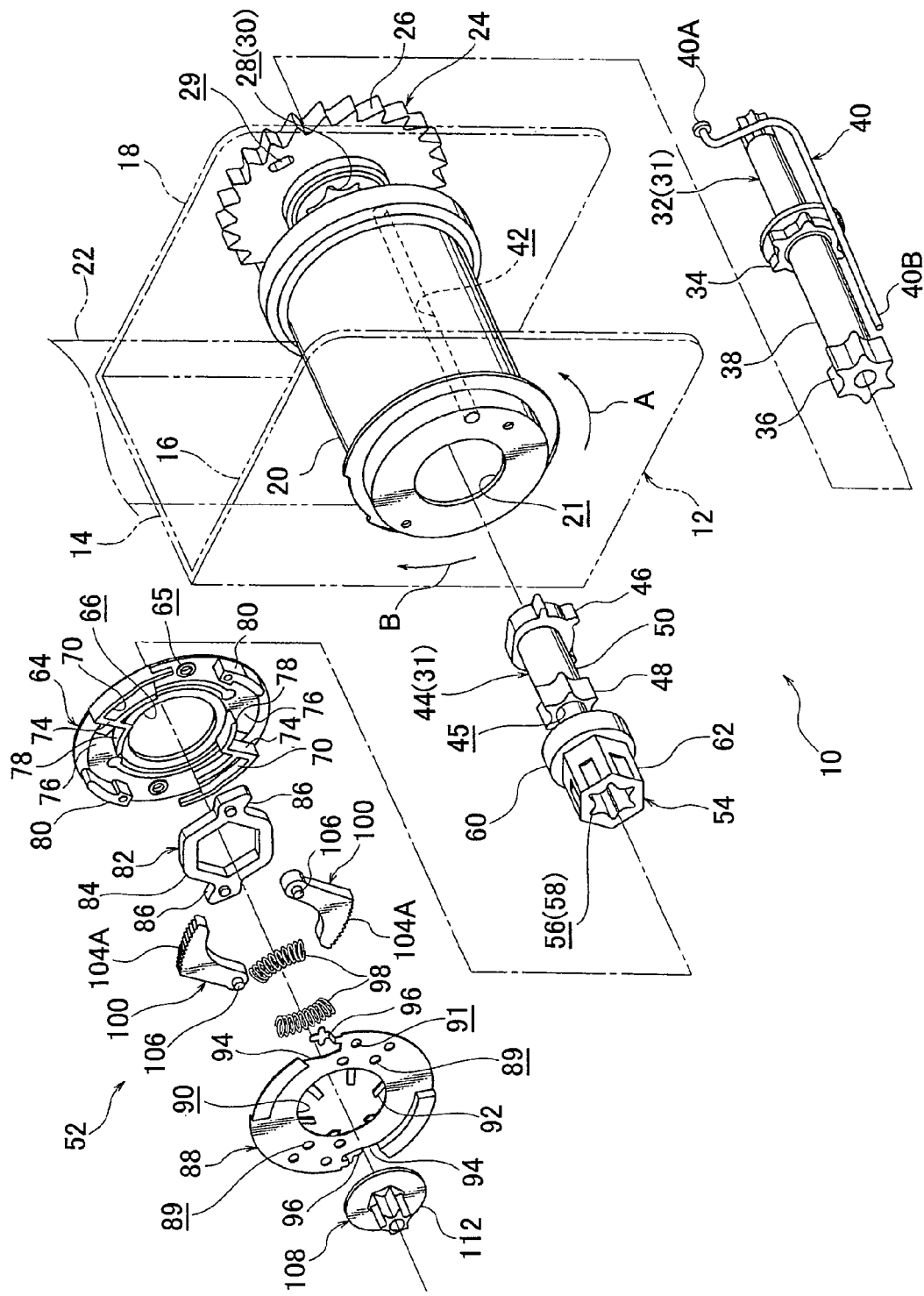
FIG. 1 is an exploded perspective view illustrating a configuration of relevant portions of a webbing take-up device according to an exemplary embodiment of the present invention.
Figure 2:
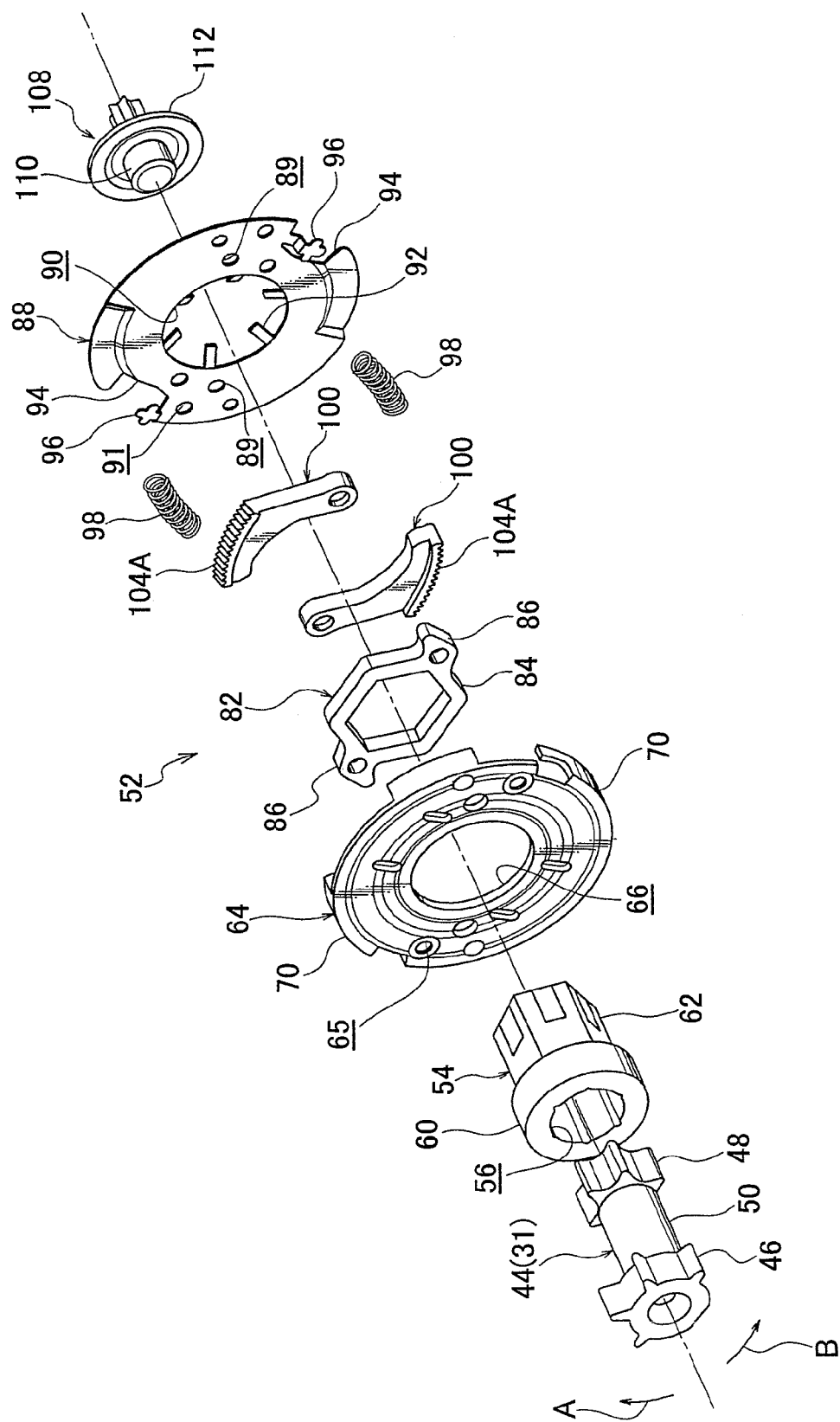
FIG. 2 is an exploded perspective view illustrating a configuration of a clutch mechanism of the webbing take-up device illustrated in FIG. 1.
Figure 5:
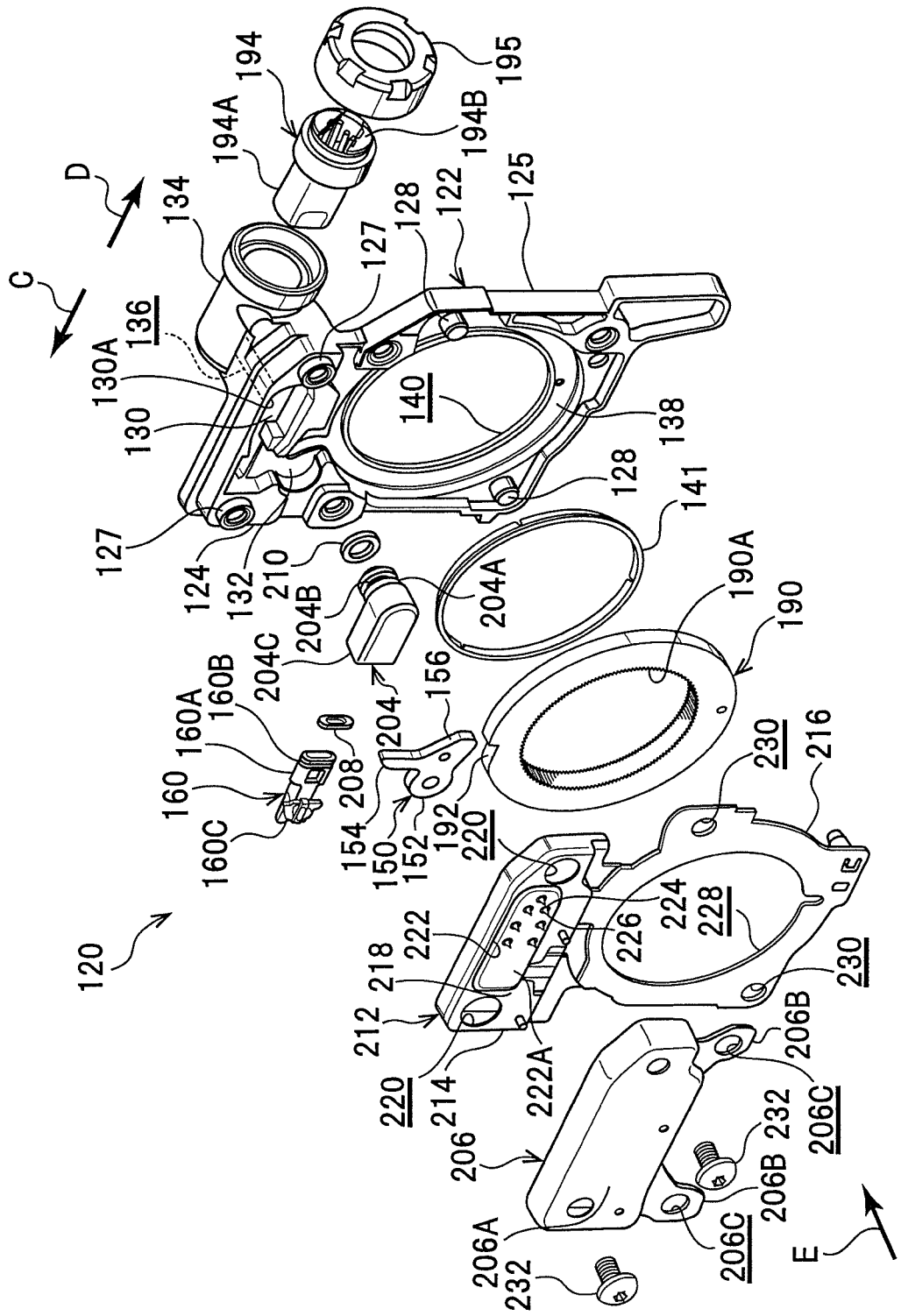
FIG. 5 is an exploded perspective view illustrating a configuration of a switching mechanism of the webbing take-up device illustrated in FIG. 1.

As illustrated in FIG. 1 and FIG. 2, a webbing take-up device 10 according to an exemplary embodiment of the present invention is equipped with a frame 12, a spool 20, a webbing 22, a lock gear 24 serving as a lock section, a main torsion shaft 32 that configures a force limiter mechanism 31, a trigger wire 40, a sub torsion shaft 44 and a clutch mechanism 52. The webbing take-up device 10 is also equipped with a switching mechanism 120, as illustrated in FIG. 5. Explanation first follows regarding the frame 12, followed by explanation in sequence regarding the spool 20, the webbing 22, the lock gear 24, the main torsion shaft 32, the trigger wire 40, the sub torsion shaft 44, the clutch mechanism 52 and the switching mechanism 120.

As illustrated in FIG. 1, the frame 12 is formed with a substantially concave shape in plan view, and is equipped with a plate shaped back plate 14 that is fixed to a vehicle body. Leg plates 16 and 18 extend out substantially at right angles from the both width direction edge portions of the back plate 14. Note that a known lock mechanism (not shown in the drawings) is attached at the outside of the leg plate 18.

The spool 20 is formed with a circular cylinder shape with a through hole 21 passing through along the axial direction, and is disposed between the leg plate 16 and the leg plate 18 of the frame 12. The spool 20 is disposed in a state such that its axial direction is along the facing direction of the leg plate 16 and the leg plate 18, and is rotatably supported by the frame 12 through the main torsion shaft 32 and the sub torsion shaft 44, described later.

The webbing 22 is for fitting over the body of an occupant, and a base end portion that is one length direction end portion of the webbing 22 is anchored to the spool 20. The spool 20 is configured to take up and store the webbing 22 from the base end side by rotating in a take-up direction (the arrow A direction in for example FIG. 1) that is one of the rotation directions.

The lock gear 24 is disposed at one axial direction side of the spool 20 and coaxially to the spool 20. A gear section 26 is formed to an outer peripheral portion of the lock gear 24. A through hole 28 is also formed at an axial center portion of the lock gear 24 so as to pass through along the axial direction. A spline shaped engaged portion 30 is formed at an inner peripheral portion of the through hole 28.

The lock gear 24 engages with a lock member (not shown in the drawings) when the vehicle suddenly decelerates, when the spool 20 is suddenly rotated in a pull-out direction. As a result, rotation of the lock gear 24 in the pull-out direction (the arrow B direction in for example in FIG. 1) is restricted (locked) and rotation of the spool 20 in the pull-out direction is restricted.

The main torsion shaft 32 is disposed coaxially to the spool 20 and the lock gear 24, and is inserted respectively into the through hole 21 of the spool 20 and the through hole 28 of the lock gear 24. A spline shaped first engagement portion 34 is formed to a length direction central portion of the main torsion shaft 32, and a spline shaped second engagement portion 36 is formed to a leading end portion of the main torsion shaft 32. The main torsion shaft 32 is fixed so as to be capable of rotating integrally with the lock gear 24 by the first engagement portion 34 engaging with the engaged portion 30 of the lock gear 24. The main torsion shaft 32 is fixed so as to be capable of rotating integrally with the spool 20 by the second engagement portion 36 engaging with an engaged portion, not shown in the drawings, formed to an axial direction intermediate portion of an inner peripheral portion of the spool 20. The portion of the main torsion shaft 32 between the first engagement portion 34 and the second engagement portion 36 configures a first energy absorption section 38 for absorbing kinetic energy of an occupant, which is provided for tension on the webbing 22, as described later.

A base end portion 40A of the trigger wire 40 is inserted in a hole 29 formed in the lock gear 24 at a position further to the radial direction outside than the through hole 28, and is anchored to the lock gear 24. The trigger wire 40 further to the leading end side than the base end portion 40A is inserted into a hole 42 formed to the spool 20 parallel to the through hole 21, and a leading end portion 40B projects out from the spool 20 to another axial direction end side.

The sub torsion shaft 44 is disposed coaxially to the main torsion shaft 32, and the sub torsion shaft 44 further to the base end side than a length direction central portion of the sub torsion shaft 44 is inserted into the through hole 21 of the spool 20. The sub torsion shaft 44 further to the leading end side than the length direction central portion projects out from the spool 20 to the other axial direction side. A spline shaped first engagement portion 46 (at least a part of the first engagement portion has a spline shape) is formed to the base end portion of the sub torsion shaft 44, and a spline shaped second engagement portion 48 is formed to a leading end portion of the sub torsion shaft 44. The first engagement portion 46 engages with an engaged portion, not shown in the drawings, formed to an axial direction intermediate portion of an inner peripheral portion of the spool 20. The sub torsion shaft 44 is thereby fixed so as to capable of rotating integrally with the spool 20. A portion of the sub torsion shaft 44 between the first engagement portion 46 and the second engagement portion 48 configures a second energy absorbing section 50 for absorbing kinetic energy of an occupant, which is provided for as tension to the webbing 22, as described below.

Figure 4A:
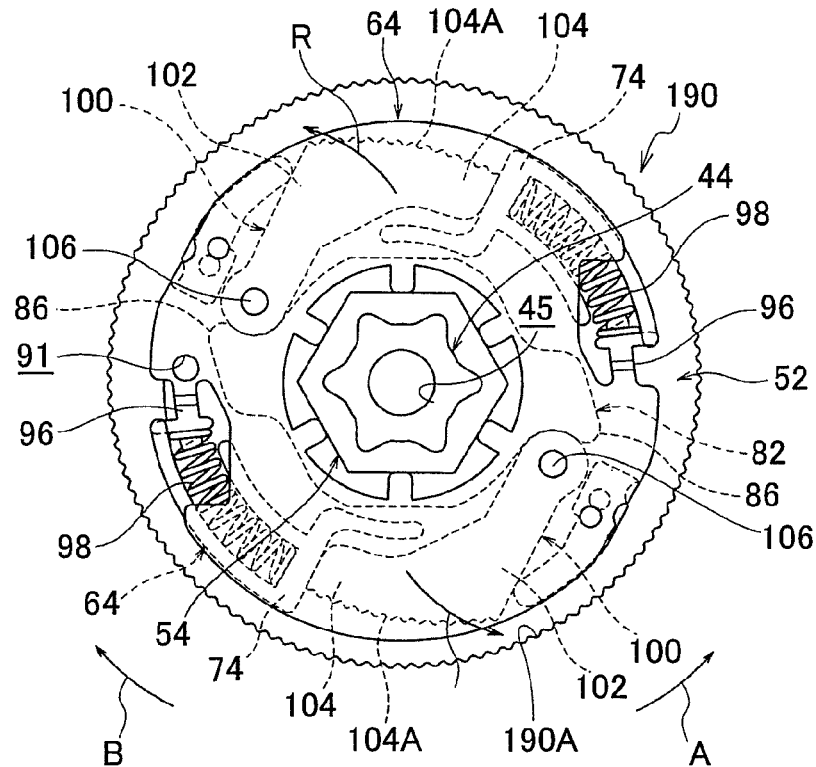
FIG. 4A is a diagram illustrating a state in which clutch plates of the clutch mechanism illustrated in FIG. 3 have started to swing towards a lock ring side.
Figure 4B:
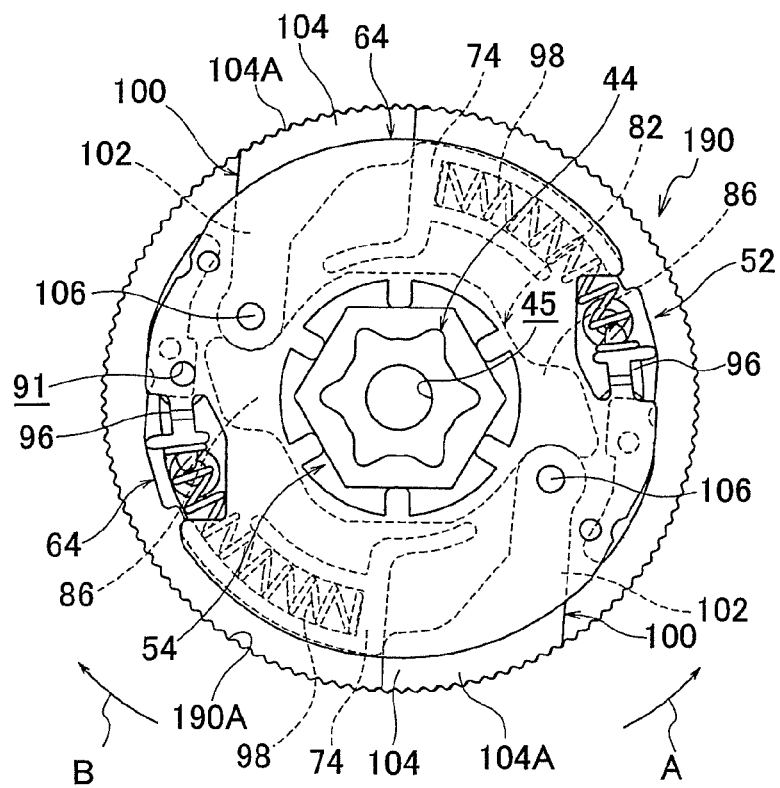
FIG. 4B is a diagram illustrating a state in which the clutch plates are meshed with the lock ring.

As illustrated in FIG. 1 and FIG. 2, the clutch mechanism 52 includes a sleeve 54, a clutch guide 64, a clutch base 82, a clutch cover 88, a pair of clutch plates 100, a screw 108 and a pair of coil springs 98. Note that a state partway through actuation of the clutch mechanism 52 is illustrated in FIG. 4A, and an actuation completed state of the clutch mechanism 52 is illustrated in FIG. 4B.

The sleeve 54 is disposed coaxially to the sub torsion shaft 44. A through hole 56 is formed to an axial center portion of the sleeve 54, passing through along the axial direction. The sub torsion shaft 44 is inserted into the through hole 56 with play therebetween. A spline shaped engaged portion 58 is formed at the leading end side of an inner peripheral portion of the sleeve 54. The sleeve 54 is fixed so as to be capable of rotating integrally with the sub torsion shaft 44 due to the second engagement portion 48 of the sub torsion shaft 44 engaging with the engaged portion 58. The base end side of the sleeve 54 is configured as a support section 60 having a circular shaped external profile, and the sleeve 54 further to the leading end side than the support section 60 configures a fitting portion 62 formed with a hexagonal shaped external profile.

Figure 3:
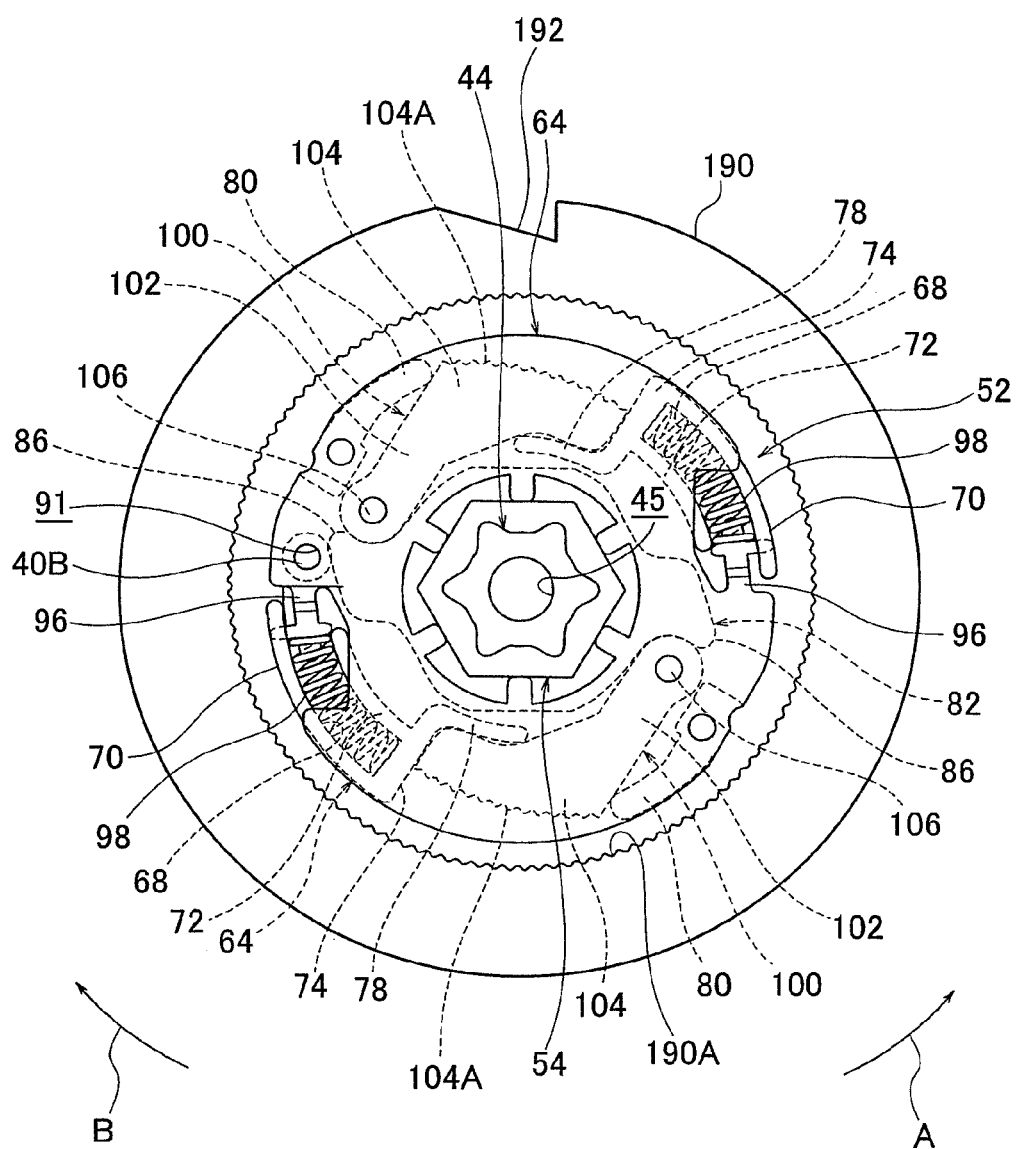
FIG. 3 is a diagram illustrating the clutch mechanism of the webbing take-up device illustrated in FIG. 1, as viewed from the opposite side to a spool.

The clutch guide 64 is made from resin, and is formed in a ring shape with a through hole 66 passing through along the axial direction. The support section 60 is inserted into the through hole 66, and the clutch guide 64 is thereby supported so as to be capable of relative rotation with respect to the sleeve 54. A pair of coil spring housing sections 68 for housing the coil springs 98 are formed at two circumferential direction locations on the clutch guide 64, as illustrated in FIG. 3. The coil spring housing sections 68 are formed symmetrical to each other about a central portion of the clutch guide 64 as a center. The coil spring housing sections 68 are respectively formed in substantially U-shapes that each include an outside wall portion 70 and an inside wall portion 72 that extend along the clutch guide 64 circumferential direction, and connection wall portions 74 that extend along the clutch guide 64 radial direction and connect together respective end portions of the outside wall portion 70 and the inside wall portion 72. The clutch guide 64 is also formed with a pair of clutch plate housing sections 76 that house the clutch plates 100 and are each adjacent to the respective coil spring housing sections 68. The clutch plate housing section 76 is formed with a first support wall portion 78 that extends out from the connection wall portion 74 to the opposite side to that of the inside wall portion 72, and with a second support wall portion 80 that is disposed separated from the connection wall portion 74 on the opposite side of the connection wall portion 74 to the outside wall portion 70.

As illustrated in FIG. 1 and FIG. 2, the clutch base 82 is configured having a ring shaped fitted-to portion 84 formed in a hexagonal shape. The fitting portion 62 of the sleeve 54 is fitted to (press-inserted into) the inside of the fitted-to portion 84, and the clutch base 82 is thereby fixed so as to be capable of rotating integrally with the sleeve 54. Note that in another exemplary embodiment, the sleeve 54 and the clutch base 82 may be integrally formed to each other. A pair of anchor portions 86 are formed to the clutch base 82 so as to project out towards the outside from the fitted-to portion 84. The anchor portions 86 anchor to base end portions of arm portions 102 formed to the clutch plates 100, described later.

The clutch cover 88 is disposed coaxially to the sleeve 54, and disposed facing towards the clutch guide 64 and on the opposite side of the clutch guide 64 to the spool 20. The clutch cover 88 is formed in a ring shape that has a through hole 90 passing through in the axial direction. Plural fitting claws 92 are formed to an inner peripheral portion of the clutch cover 88 so as to project out towards the radial direction inside. The fitting portion 62 of the sleeve 54 is inserted into the through hole 90, and the plural fitting claws 92 fit together with the fitting portion 62. The clutch cover 88 is thereby fixed so as to be capable of rotating integrally with the sleeve 54, and therefore also with the sub torsion shaft 44. The clutch cover 88 is configured such that cross-shaped tabs 96, described later, engage with the clutch guide 64 in the circumferential direction. The clutch guide 64 is capable of relative rotation with respect to the clutch cover 88 between an actuated position illustrated in FIG. 4B and a non-actuated position illustrated in FIG. 3. Cut out portions 94 are respectively formed at two circumferential direction locations on the clutch cover 88 so as to form indented shapes open to the radial direction outside as viewed along the axial direction. The pair of cross-shaped tabs 96 are formed to the clutch cover 88 so as to be positioned at the inside of the respective cut out portions 94. The pair of cross-shaped tabs 96 are formed so as to be symmetrical to each other about a central portion of the clutch cover 88 as a center. The cross-shaped tabs 96 bend in a crank shape as viewed from the clutch cover 88 radial direction, such that the leading end sides of the cross-shaped tabs 96 project out further towards the clutch guide 64 side than the base end sides thereof.

The leading end side of each of the cross-shaped tabs 96 is provided with an inside projection portion that projects towards the clutch guide 64 radial direction inside, an outside projection portion that projects towards the clutch guide 64 radial direction outside, and a circumferential direction projection portion that projects towards one circumferential direction of the clutch guide 64 (the take-up direction). The leading end side of each of the cross-shaped tabs 96 is formed in a cross-shape as viewed along the clutch guide 64 axial direction.

The clutch plates 100 are disposed between the clutch cover 88 and the clutch guide 64. The clutch plates 100 each have an arm portion 102 and a circular arc portion 104 formed to a leading end portion of the arm portion 102. A swing (rotating) shaft 106 is formed to a base end portion of each of the arm portions 102 so as to project out to the clutch cover 88 side and to extend along the sub torsion shaft 44 axial direction. The clutch plates 100 are supported by the clutch cover 88 so as to be capable of swinging (rotating) by the swing shafts 106 being inserted into the holes 89 formed in the clutch cover 88. Straight pattern shaped knurled teeth 104A are formed to outer peripheral portions of the circular arc portions 104 (leading end portions of the clutch plates 100).

The screw 108 is configured having a screw portion 110 and a press portion 112 of larger diameter than the screw portion 110. The screw portion 110 screws into a screw hole 45 formed at a leading end portion of the sub torsion shaft 44, thereby fixing the screw 108 to the leading end portion of the sub torsion shaft 44. In such a fixed state of the screw 108 to the leading end portion of the sub torsion shaft 44, the press portion 112 makes contact with the leading end portion of the sleeve 54. Movement of the sleeve 54 in the direction to come off from the sub torsion shaft 44 is thereby restricted. Note that in this state the clutch guide 64 is restricted from moving in the axial direction by the clutch cover 88 and the spool 20.

Holes 65 and 91 are formed respectively in the clutch guide 64 and the clutch cover 88. The holes 65 and 91 are formed so as to face each other in a state in which the clutch guide 64 is disposed in the non-actuated position with respect to the clutch cover 88, and the leading end portion 40B of the trigger wire 40 is respectively inserted into the holes 65 and 91. The clutch guide 64 is thereby restricted from relative rotation with respect to the spool 20 and the clutch cover 88 in a state disposed in the non-actuated position (the clutch guide 64 is restrained in the non-actuated position).

Moreover, when the clutch guide 64 is in the restrained state in the non-actuated position as described above, each of the cross-shaped tabs 96 of the clutch cover 88 is disposed in the vicinity of the respective opening of each of the coil spring housing sections 68 of the clutch guide 64. The circumferential direction projection portion of each of the cross-shaped tabs 96 is inserted inside the respective coil spring 98 from one axial direction end portion of the coil spring 98 housed in the respective coil spring housing section 68, and the inside projection portion and the outside projection portion of each of the cross-shaped tabs 96 abut one axial direction end portion of the coil spring 98. The one axial direction end portion of each of the coil springs 98 is thereby anchored to each of the cross-shaped tabs 96. Another axial direction end portion of each of the coil springs 98 is anchored to the connection wall portion 74 of the coil spring housing section 68 (see FIG. 3).

In this state, the separation between the cross-shaped tab 96 and the connection wall portion 74 is shorter than the overall length of the coil spring 98 in a free state, and so the coil spring 98 is accordingly in a compressed state. Biasing force is thereby imparted to the clutch guide 64 in the take-up direction, biasing the clutch guide 64 towards the actuated position.

This state is a state in which sufficient separation is secured between the hole 89 of the clutch cover 88 (the swing shaft 106 of the clutch plate 100) and the connection wall portion 74, so the clutch plates 100 are housed in the clutch plate housing sections 76 such that the knurled teeth 104A are housed further to the inside than outer peripheral portion of the clutch guide 64. In this state the connection wall portions 74 are in contact with leading ends of the circular arc portions 104.

Explanation follows regarding the switching mechanism 120 that is a relevant portion of the present exemplary embodiment.

As illustrated in FIG. 5, the switching mechanism 120 is equipped with a body 122 formed in a box shape, a gas generator 194 attached to the body 122, a piston 160 that is actuated by receipt of pressure from gas generated by the gas generator 194, and a cylinder 204 that internally houses the piston 160. The switching mechanism 120 is equipped with a pawl 150 whose placement is switched by being pressed by the piston 160, and a lock ring 190 in which rotation is restricted or is released from the restriction by the pawl 150. The switching mechanism 120 is further provided with a sheet 212, so as to cover the piston 160, the cylinder 204, the pawl 150 and the lock ring 190 housed in the body 122, and a support plate 206 attached to the body 122 from the outside of the sheet 212.

The body 122 is formed by die-casting and formed so as to be open towards the leg plate 16 side of the frame 12 (see FIG. 1). Specifically, the body 122 is equipped with a case section 124, described later, that houses the housing pawl 150, the piston 160, the cylinder 204 and the gas generator 194, and a lock ring housing section 125 that houses the lock ring 190.

A housing groove 130 is formed at the case section 124 so as to house the piston 160 and the cylinder 204, extend in the arrow C direction and the arrow D direction, and open towards the leg plate 16 side of the frame 12 (see FIG. 1). Moreover, a recess portion 132 is formed in the case section 124 so as to house the pawl 150, connect to the housing groove 130, and open towards the leg plate 16 side of the frame 12 (see FIG. 1). An attachment portion 134 for attaching the gas generator 194 is also formed to the case section 124. A tube shaped communication path 136 is also formed to the case section 124 with its axial direction oriented in the same direction as the spool 20 axial direction (see FIG. 1). The communication path 136 communicates the housing groove 130 and attachment portion 134 with each other. As a result, gas generated from the gas generator 194 is able to flow in towards the housing groove 130 side.

A recess portion 138 in which the lock ring 190 is housed is formed in the lock ring housing section 125 so as to open towards the leg plate 16 side of the frame 12 (see FIG. 1). A circular shaped opening 140 is formed in the recess portion 138 coaxially to the axis of the spool 20 (see FIG. 1). A bush 141 is attached to an edge portion of the opening 140.

The body 122 described above is fixed at the outside of the leg plate 16 (see FIG. 1).

The gas generator 194 is formed in a substantially circular column shape. One end portion of the gas generator 194 is configured by a gas ejection portion 194A that ejects gas, and another end portion of the gas generator 194 is configured by a connection terminal portion 194B to which wiring is connected. The gas generator 194 is inserted from the gas ejection portion 194A side into the attachment portion 134 of the body 122, and is fixed to the body 122 with using a fixing member 195.

The piston 160 is integrally formed using a resin material. Specifically, the base end side of the piston 160 is formed in an elliptical column shape so as to configure a piston portion 160A that insert-fits into a cylinder portion 204C of the cylinder 204, described later. An O-ring mounting groove 160B is formed to the piston portion 160A and an O-ring 208 is mounted to the O-ring mounting groove 160B. Gas generated from the gas generator 194 is prevented by the O-ring 208 from leaking out between the piston portion 160A and the cylinder portion 204C of the cylinder 204. A pressing (pushing) portion 160C that presses (pushes) an arm portion 154 of the pawl 150 is configured at the leading end side of the piston 160.

The cylinder 204 is, similarly to the piston described above, integrally formed using a resin material. Specifically, the cylinder 204 is equipped with a tube shaped insertion portion 204A that is inserted into the communication path 136 formed at the case section 124 of the body 122. An O-ring mounting groove 204B is formed to the insertion portion 204A, and an O-ring 210 is mounted in the O-ring mounting groove 204B. Gas generated from the gas generator 194 is prevented from leaking out from between the insertion portion 204A of the cylinder 204 and the communication path 136 by the O-ring 210. The cylinder 204 is also equipped with the cylinder portion 204C formed such that it is bend at an end portion of the insertion portion 204A towards the arrow C direction. The external profile of the cylinder portion 204C is formed with a substantially rectangular column shape, and is provided with a through hole formed in an elliptical tube shape. The piston portion 160A of the piston 160 insert-fits into the through hole of the cylinder portion 204C. As a result, it is possible to move the piston 160 in a straight line towards the arrow C direction by the pressure of gas generated from the gas generator 194.

The pawl 150 is formed in a substantially plate shape, and is equipped with a shaft portion 152 with a substantially circular shaped cross-section, an arm portion 154 and an engagement portion 156, formed so as to extend out towards the shaft portion 152 radial direction outside. The shaft portion 152 is rotatably supported by the recess portion 132 formed at the case section 124 of the body 122. Moreover, as illustrated in FIG. 6, the arm portion 154 is disposed so as to be adjacent (near) to the pressing portion 160C of the piston 160 in a state in which the engagement portion 156 is engaged with a notch portion 192 of the lock ring 190, described later (the position of the pawl 150 in this state is referred to as a "locked position", serving as a first position).

As illustrated in FIG. 5, the lock ring 190 is formed in a substantially circular ring plate shape, and is rotatably supported in the recess portion 138 formed at the lock ring housing section 125 of the body 122. The lock ring 190 is disposed at the outer peripheral side of the clutch mechanism 52 (see FIG. 1) and coaxial to the clutch mechanism 52. Straight pattern shaped knurled teeth 190A are formed to an inner peripheral portion of the lock ring 190. The notch portion 192 is also formed to an outer peripheral portion of the lock ring 190 with a substantially triangular shaped cross-section, and the notch portion 192 is open towards the lock ring 190 radial direction outside.

Figure 6:
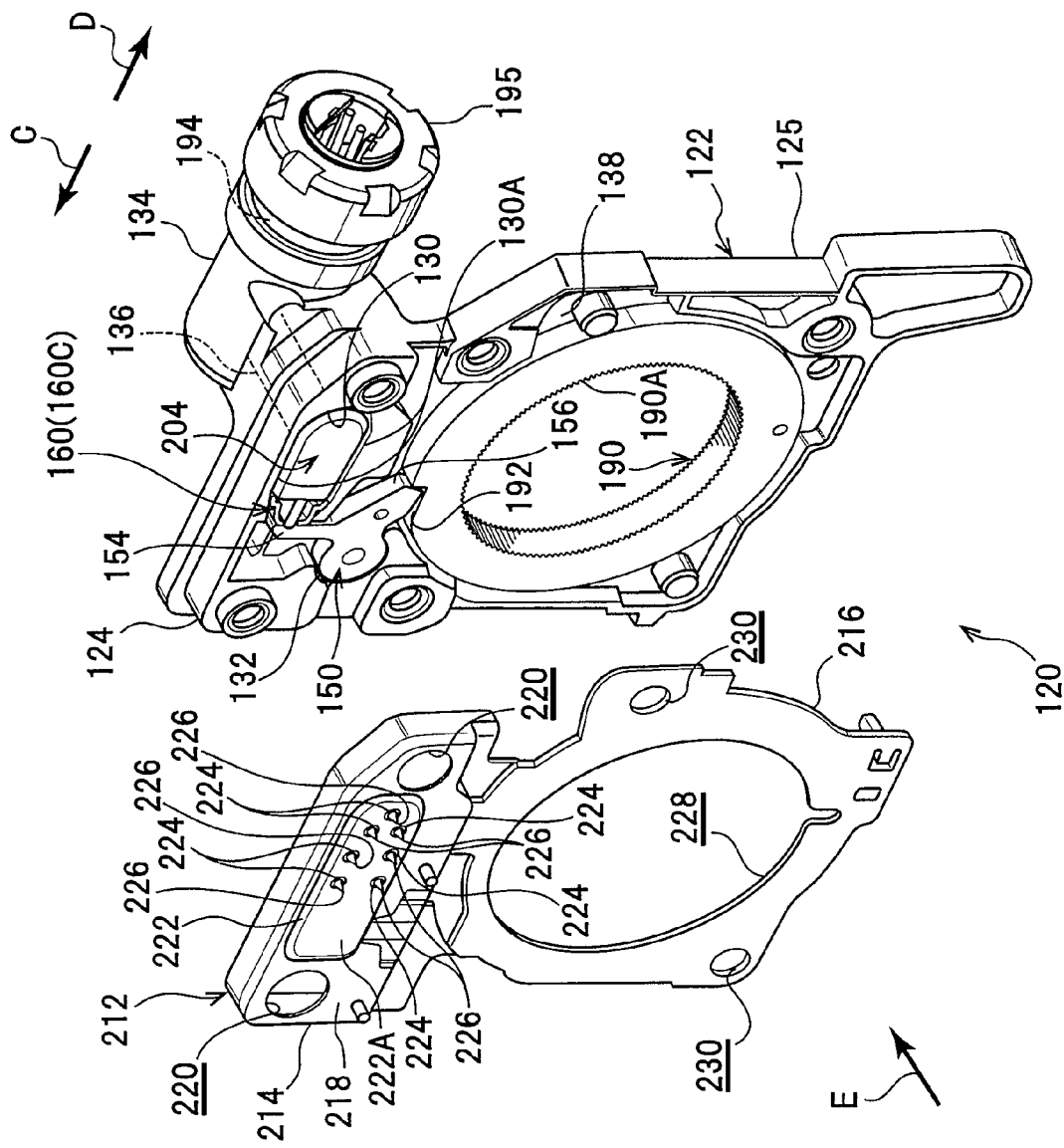
FIG. 6 is a perspective view illustrating a configuration of relevant portions of a switching mechanism of the webbing take-up device illustrated in FIG. 1.
Figure 7:
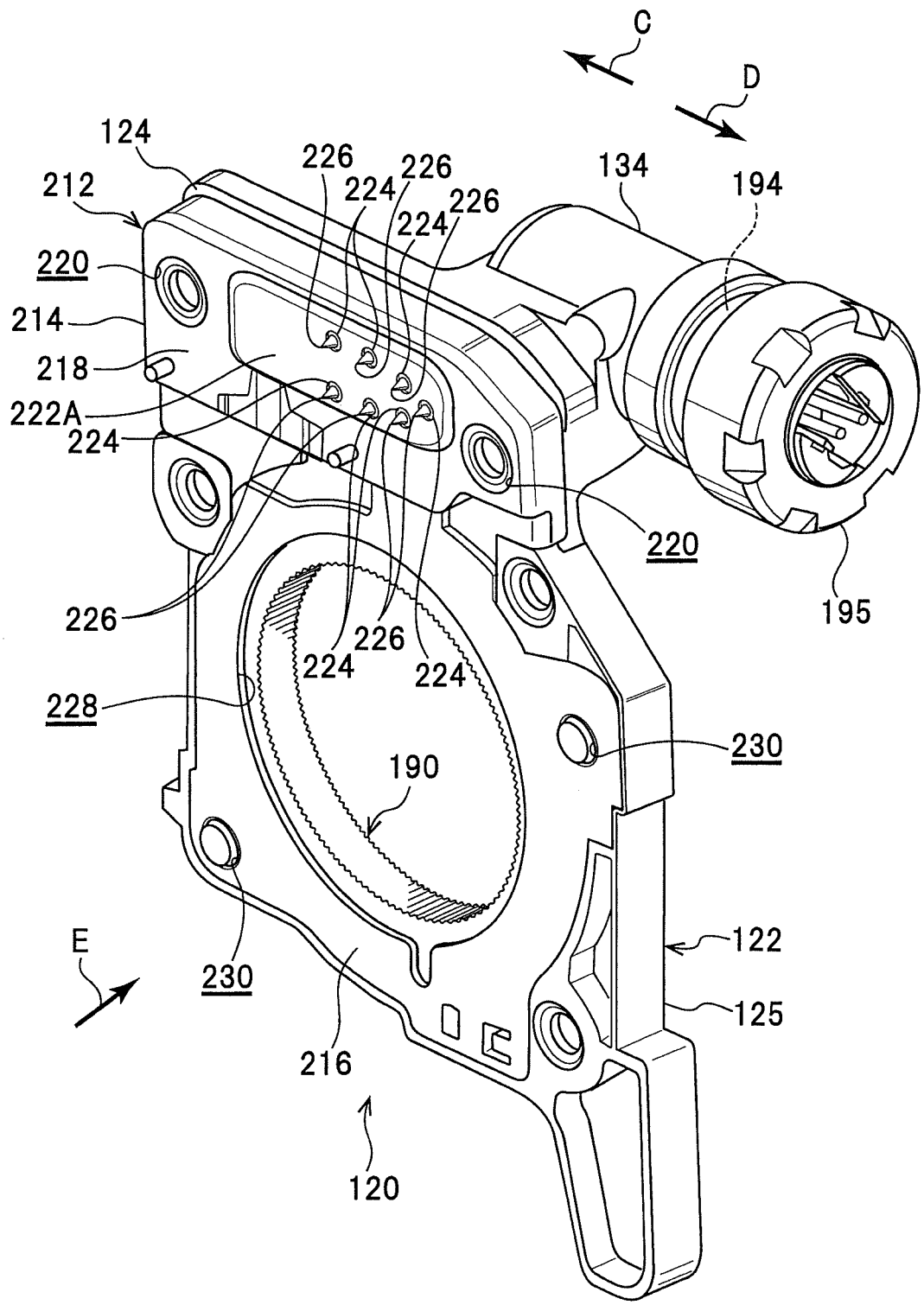
FIG. 7 is a perspective view illustrating a state in which a sheet has been attached to a body of the webbing take-up device illustrated in FIG. 1.

As illustrated in FIG. 6 and FIG. 7, the sheet 212 is formed with a resin material into a substantially plate shape. Specifically, the sheet 212 is equipped with a first cover portion 214 that covers the housing groove 130 and the recess portion 132 formed in the case section 124 of the body 122, and a second cover portion 216 that covers the recess portion 138 formed to the lock ring housing section 125.

The sheet 212 (the first cover portion 214) is provided at the opposite side of the cylinder portion 204C with respect to the insertion portion 204A, serving as a gas flow-in portion from which the gas generated at the gas generator 194 is flown-in inside the cylinder 204 (the cylinder portion 204C), of the cylinder 204.

The first cover portion 214 is equipped with a general portion 218 that extends along the case section 124 of the body 122. Openings 220 are formed in the general portion 218 for positioning the sheet 212 with respect to the body 122 by fitting onto bosses 127 formed to the case section 124. Moreover, as illustrated in FIG. 6, in a state in which the cylinder 204 is housed in the housing groove 130 of the case section 124, a protruding portion 222 is formed at a position in the general portion 218 of the first cover portion 214, facing the cylinder 204, formed so as to protrude out towards the direction away from the cylinder 204. The protruding portion 222 is formed in a substantially rectangular shape in plan view (as viewed along the arrow E direction), and the top (apex) face of the protruding portion 222 configures a receiving surface 222A that makes contact with a base wall portion 206A of the support plate 206 under certain condition, as described later. The protruding portion 222 is equipped with indentations (recess portions) 224 formed along the piston portion 160A of the piston 160 (the cylinder portion 204C of the cylinder 204) and formed so as to indent (be recessed) towards the piston 160 side (towards the cylinder 204 side) (the indentations 224 are provided at 7 locations in the present exemplary embodiment). A crushable (deformable) rib 226 serving as a rib is provided inside each of the indentations 224. The crushable ribs 226 are formed in substantially conical shapes so as to project out towards the opening direction of the indentations 224.

A base end of the crushable rib 226 is provided at a bottom surface of the indentation 224. A length of the crushable rib 226 from the base end thereof to a tip end thereof (a height of the crushable rib 226) is longer than a depth of the indentation 224 in the recess direction, namely, the tip end of the crushable rib 226 (before deformed) is protruded towards the support plate 206 side further than the opening of the indentation 224.

The projection amount of the crushable ribs 226 from the receiving surface 222A is set at a projection amount such that the leading end portions of the crushable ribs 226 are crushed (deformed) in an attached state of the support plate 206, described later. The crushable ribs 226 provided inside each of the respective indentations 224 are provided inside an opening edge portion 130A of the housing groove 130 in plan view (as viewed from the arrow E direction).

An opening 228 is formed in the second cover portion 216 so as to be coaxial to the opening 140 formed in the lock ring housing section 125 of the body 122. Openings 230 are also formed in the second cover portion 216 for positioning the sheet 212 with respect to the body 122 by fitting over bosses 128 formed at the case section 124.

Figure 8:
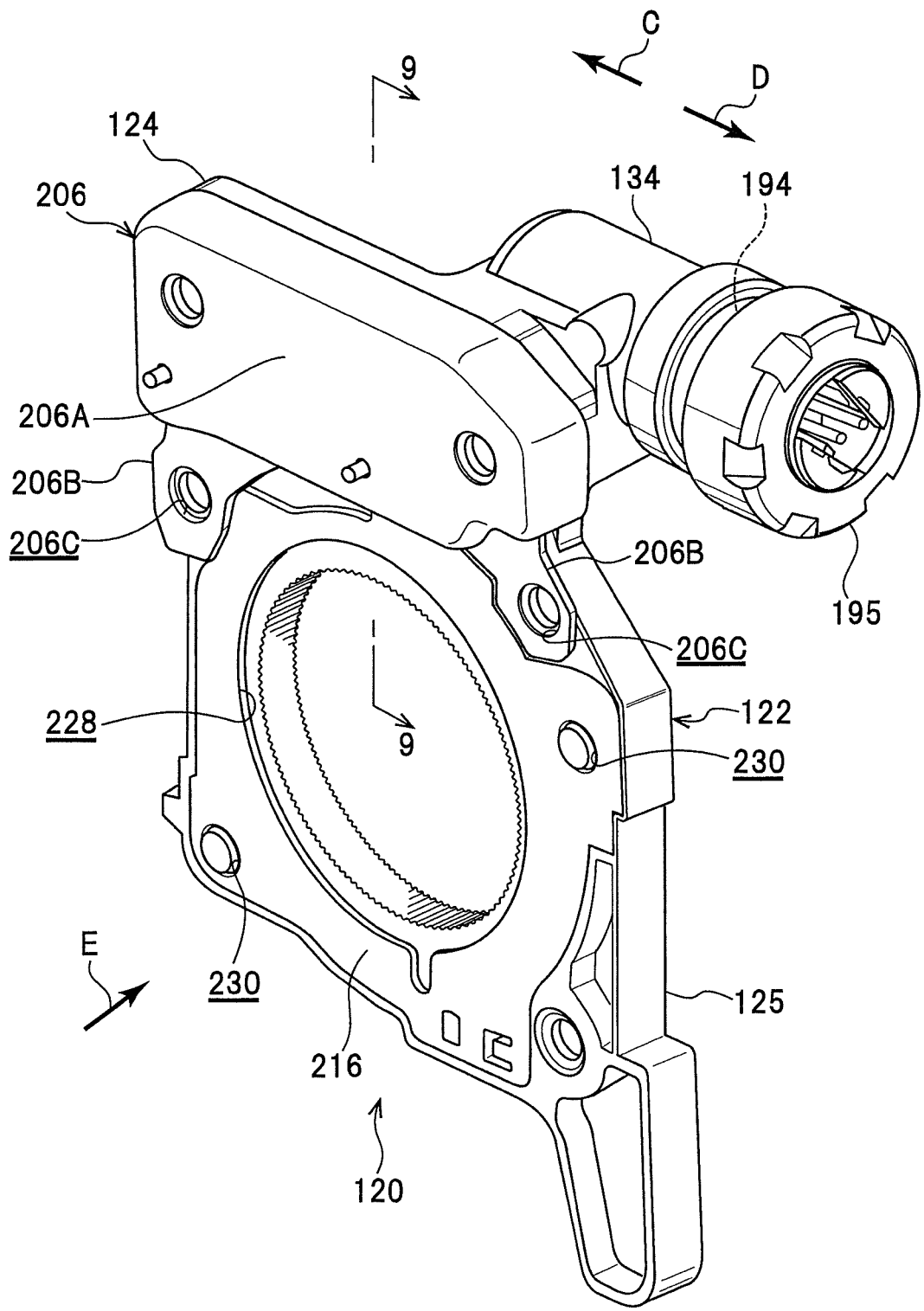
FIG. 8 is a perspective view illustrating a state in which a support plate has been attached to a body of the webbing take-up device illustrated in FIG. 1.
Figure 9:
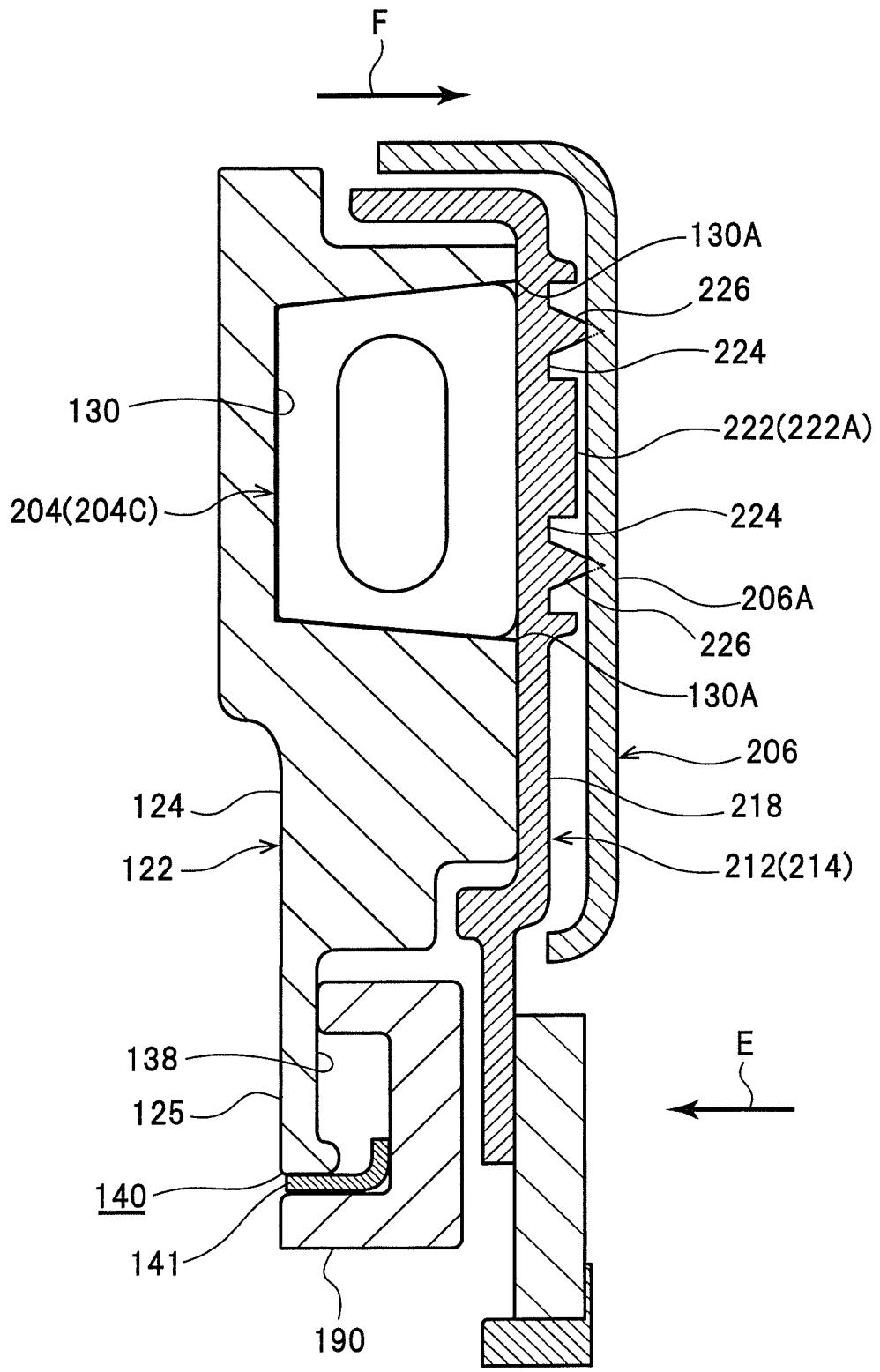
FIG. 9 is an enlarged cross-section illustrating a cross-section of the webbing take-up device illustrated in FIG. 8, taken on line 9-9.
Figure 10:
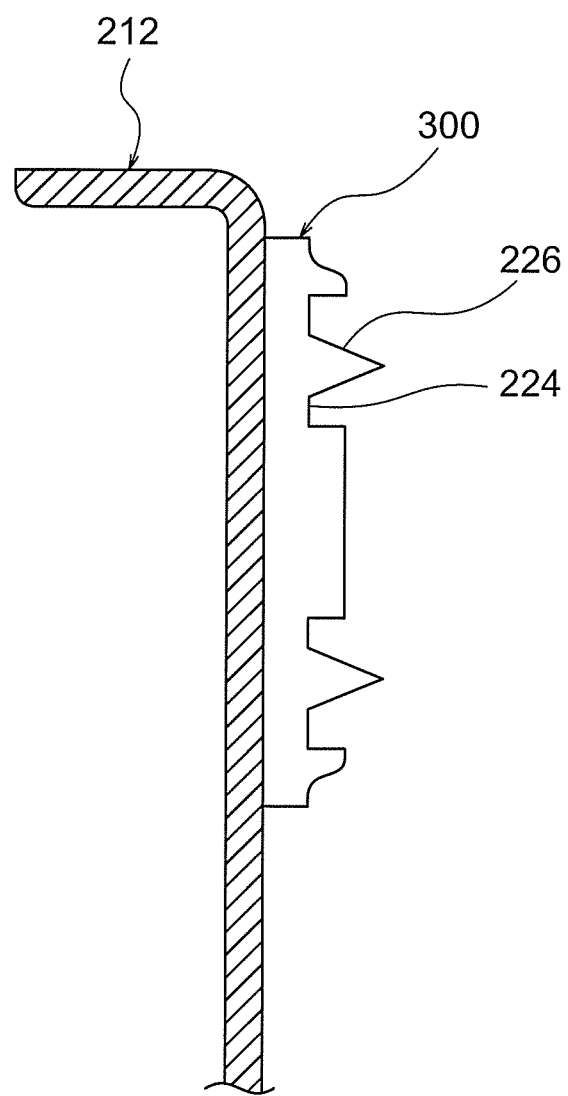
FIG. 10 is an enlarged cross-section illustrating a cross-section illustrating a member used in a webbing take-up device according to a modified exemplary embodiment of the present invention.

The support plate 206 is a press-formed component formed by pressing working a thin steel plate. Specifically, the support plate 206 is equipped with the base wall portion 206A that extends along the first cover portion 214 of the sheet 212, and attachment portions 206B and attachment openings 206C for attaching to the body 122. As illustrated in FIG. 8, the support plate 206 is disposed such that the base wall portion 206A of the support plate 206 covers the first cover portion 214 of the sheet 212, and is fixed to the body 122 using bolts 232 (see FIG. 5). As a result, as illustrated in FIG. 9, the leading ends of the crushable ribs 226 provided to the sheet 212 make contact with the base wall portion 206A of the support plate 206, and further, the leading end portions of the crushable ribs 226 are crushed by the base wall portion 206A of the support plate 206. In other words, the insertion portion 204A of the cylinder 204 is prevented from moving in the direction to come out from the communication path 136 formed to the case section 124 of the body 122 by the crushable ribs 226 pressing (pushing) the cylinder 204 towards the body 122 side through the general portion 218 of the sheet 212.

Operation and Advantageous Effects of the Present Exemplary Embodiment

Explanation follows regarding the operation and advantageous effects of the present exemplary embodiment.

In the webbing take-up device 10 according to the present exemplary embodiment, configuration is such that the spool 20, the lock gear 24, the main torsion shaft 32, the sub torsion shaft 44 and the clutch mechanism 52 (including the sleeve 54, the clutch base 82, the clutch plates 100 and the screw 108) are capable of rotating integrally with each other in the take-up direction and the pull-out direction. Thus, the webbing 22 is fitted over the body of a vehicle occupant by pulling the webbing 22 out from the spool 20. In a state in which the webbing 22 is fitted over the body of the vehicle occupant, rotation of the lock gear 24 in the pull-out direction is blocked when the lock mechanism is actuated, for example when there is a sudden vehicle deceleration state. As a result, rotation in the pull-out direction of the spool 20 that is connected to the lock gear 24 through the main torsion shaft 32 is restricted, restricting the webbing 22 from being pulled out from the spool 20. Consequently, the body of the occupant that is attempting to move towards the vehicle front is restrained by the webbing 22.

When the body of the occupant pulls the webbing 22 with an even greater force in the state in which rotation of the lock gear 24 in the pull-out direction is blocked, at the point when the rotation force of the spool 20 in the pull-out direction arising from this tension force exceeds the twist resisting load (deformation resisting load) of the first energy absorbing section 38 of the main torsion shaft 32, the force limiter mechanism 31 actuates, and rotation in the pull-out direction of the spool 20, at a force limiter load of the spool 20 (twist resisting load of the first energy absorbing section 38) or greater, is permitted due to twisting (deformation) of the first energy absorbing section 38.

The spool 20 accordingly rotates in the pull-out direction due to twisting of the first energy absorbing section 38, and load (burden) on the chest region of the occupant from the webbing 22 is reduced due to the webbing 22 being pulled out from the spool 20. Kinetic energy of the occupant used for tension on the webbing 22 is absorbed by the amount of twisting of the first energy absorbing section 38.

On the other hand, rotation of the spool 20 in the pull-out direction with respect to the lock gear 24 as described above can be viewed as relative rotation of the lock gear 24 in the take-up direction with respect to the spool 20. Consequently, when the lock gear 24 relatively rotates in the take-up direction with respect to the spool 20, the trigger wire 40 further to the leading end side than the base end portion 40A remains inserted in the hole 42 of the spool 20, in this state, the base end portion 40A of the trigger wire 40 moves in the main torsion shaft 32 circumferential direction. The trigger wire 40 further to the leading end side than the base end portion 40A is accordingly pulled towards the lock gear 24 side with respect to the hole 42.

The leading end portion 40B of the trigger wire 40 is thereby pulled out from the hole 91 of the clutch cover 88 and from the hole 65 of the clutch guide 64, releasing the relative rotation prohibited (blocked) state of the clutch guide 64 with respect to the spool 20 and the clutch cover 88.

Then, when the clutch guide 64 is rotated from the non-actuated position to the actuated position due to biasing force of the coil springs 98, the separation between the hole 89 of the clutch cover 88 (the swing shafts 106 of the clutch plates 100) and the connection wall portion 74 of the clutch guide 64 becomes shorter, and the leading ends of the circular arc portions 104 of the clutch plates 100 are pressed (guided) by the connection wall portions 74 in clutch guide 64 tangential directions. The knurled teeth 104A of the clutch plates 100 are thereby meshed with the knurled teeth 190A of the lock ring 190 (the state illustrated in FIG. 4B) due to the clutch plates 100 swinging towards the lock ring 190 side (see arrow R in FIG. 4A). The clutch plates 100 and the lock ring 190 are accordingly coupled with each other. When this occurs, the clutch plates 100 are pressed against the lock ring 190 due to the anchor portions 86 formed to the clutch base 82 pressing the base end portions of the arm portions 102 of the clutch plates 100 in the pull-out direction, thereby maintaining the coupled state of the two members. The lock ring 190 accordingly attempts to rotate in the pull-out direction integrally with rotation of the clutch mechanism 52 (the sleeve 54, the clutch base 82 and the clutch plates 100).

A controller, not shown in the drawings, determines whether or not the body frame of the occupant is a predetermined reference value or greater based on a signal from the body frame detection unit, and determines whether or not the vehicle has been collided based on a signal from the collision detection unit. Then, when the controller has determined that the body frame of the occupant is the predetermined reference value or greater, the engagement portion 156 of the pawl 150 is disposed in the locked position and engaged with the notch portion 192 of the lock ring 190 since the gas generator 194 is not actuated. Rotation of the lock ring 190 in the pull-out direction is accordingly locked (prohibited), and so the clutch mechanism 52 (the sleeve 54, the clutch base 82 and the clutch plates 100) is prohibited from rotating in the pull-out direction.

When the body of the occupant pulls out the webbing 22 with a larger force from the state in which rotation of the sleeve 54 in the pull-out direction is prohibited, and the rotation force of the spool 20 in the pull-out direction arising from this pulling force exceeds the sum of the twist resisting load (deformation resisting load) of the first energy absorbing section 38 of the main torsion shaft 32 and the twist resisting load (deformation resisting load) of the second energy absorbing section 50 of the sub torsion shaft 44, rotation in the pull-out direction of the spool 20 is permitted, at the force limiter load of the spool 20 (the sum of the twist resisting load of the first energy absorbing section 38 and the twist resisting load of the second energy absorbing section 50) or greater, due to twisting (deformation) of the first energy absorbing section 38 and the second energy absorbing section 50.

The spool 20 accordingly rotates in the pull-out direction due to twisting of the first energy absorbing section 38 and the second energy absorbing section 50, and load (burden) on the chest region of the occupant arising from the webbing 22 is reduced by the webbing 22 being pulled out from the spool 20, and kinetic energy of the occupant used for tension on the webbing 22 is absorbed by the amount of twisting of the first energy absorbing section 38 and the second energy absorbing section 50.

On the other hand, the gas generator 194 is actuated under control from the controller when the controller determines that the body frame of the occupant is less than the predetermined reference value based on the signal from the body frame detection unit, and determines that the vehicle has been collided based on the signal from the collision detection unit.

When the gas generator 194 is actuated, gas, ejected from the gas ejection portion 194A of the gas generator 194 flows into the cylinder 204 through the communication path 136 formed to the case section 124 of the body 122, and the internal pressure of the cylinder 204 rises. As a result, the piston 160 that is fitted into the cylinder portion 204C of the cylinder 204 moves in the arrow C direction. The pressing portion 160C of the piston 160 presses the arm portion 154 of the pawl 150 due to the piston 160 moving towards the arrow C direction. As a result the pawl 150 rotates about, as the axial center, the shaft portion 152, and engagement between the engagement portion 156 of the pawl 150 and the notch portion 192 of the lock ring 190 is released (the position of the pawl 150 in this state is referred to as the "released position", serving as a second position).

As a result, by permitting rotation of the lock ring 190 in the pull-out direction, the lock ring 190 is able to rotate in the pull-out direction together with the clutch mechanism 52 (the sleeve 54, the clutch base 82 and the clutch plates 100) and the spool 20. Since twisting of the second energy absorbing section 50 accordingly does not occur, rotation of the spool 20 is permitted in the pull-out direction, due to twisting (deformation) of the first energy absorbing section 38, at the force limiter load of the spool 20 (the twist resisting load of the first energy absorbing section 38) or greater.

Namely, when the body frame of the occupant is the predetermined reference value or greater, the force limiter load is the sum of the twist resisting load of the first energy absorbing section 38 and the twist resisting load of the second energy absorbing section 50, giving a high load as the load value of the force limiter load. ON the other hand, when the body frame of the occupant is less than the predetermined reference value and the vehicle is detected as having been involved in a collision, the force limiter load is the twist resisting load of the first energy absorbing section 38, giving a low load as the load value of the force limiter load. Appropriate protection can accordingly be provided according to the body frame of the occupant.

In the present exemplary embodiment, gas generated from the gas generator 194 flows into the inside of the cylinder 204 through the communication path 136 provided to the body 122, and the internal pressure of the cylinder 204 rises. As a result, the cylinder 204 attempts to move in the direction away from the body 122 (the arrow F direction in FIG. 9) due to the gas pressure. However, in the present exemplary embodiment, with the support plate 206 being attached to the body 122, and the crushable ribs 226 press the cylinder 204 towards the body 122 side through the general portion 218 of the sheet 212. As a result, in the present exemplary embodiment, release of the connection between the communication path 136 provided to the body 122 and the insertion portion 204A of the cylinder 204 is prevented.

Moreover, in the present exemplary embodiment, the general portion 218 of the sheet 212 is pressed by the crushable ribs 226 with the support plate 206 being attached to the body 122, and the general portion 218 of the sheet 212 makes close contact with the opening edge portion 130A of the housing groove 130. As a result, for example, even if gas generated from the gas generator 194 leaks out from between the communication path 136 provided to the body 122 and the insertion portion 204A of the cylinder 204, any such leaked gas is prevented from leaking out between the general portion 218 of the sheet 212 and the opening edge portion 130A of the housing groove 130.

Moreover, in the present exemplary embodiment, when the cylinder 204 attempts to move in the direction away from the body 122 (the arrow F direction in FIG. 9) due to gas generated from the gas generator 194 flowing into the inside of the cylinder 204, the cylinder portion 204C of the cylinder 204 presses (pushes) the general portion 218 of the sheet 212, and the crushable ribs 226 are sandwiched between the general portion 218 of the sheet 212 and the base wall portion 206A of the support plate 206. In such a case, even supposing the portions of the crushable ribs 226 projecting out from the receiving surface 222A are crushed, the receiving surface 222A of the sheet 212 makes contact with the base wall portion 206A of the support plate 206. In other words the pressing force with which the cylinder 204 presses the general portion 218 of the sheet 212 can be supported by the receiving surface 222A.

In the present exemplary embodiment, the crushable ribs 226 are integrally formed to the sheet 212. The number of components can therefore be reduced in comparison to cases in which crushable ribs are provided as separate member, and hence a reduction can also be achieved in the number of processes for assembling a webbing take-up device. Moreover, in the present exemplary embodiment, the leading end portions of the crushable ribs 226 are deformed by attaching the support plate 206 to the body 122. This accordingly enables the pressing force of the cylinder 204 attempting to move on receipt of the gas pressure, to be supported by resilient force from the leading end portions of the crushable ribs 226 attempting to resiliently return (rebound).

In the present exemplary embodiment, the sealing properties to gas generated by actuation of the gas generator 194 can be enhanced, as explained above.

Note that although explanation has been given in the present exemplary embodiment of an example in which the crushable ribs 226 are integrally formed to the sheet 212, the present invention is not limited thereby. For example, similar advantageous effects to those of the above embodiment can also be obtained in a case in which a separate (another) member 300 is provided with ribs 226 formed between the sheet 212 and the support plate 206.

Note that although explanation has been given in the present exemplary embodiment of an example in which the crushable ribs 226 are provided on the inside of the opening edge portion 130A of the housing groove 130 in plan view (as viewed along the arrow E direction), the present invention is not limited thereto. For example, configuration may be made with the crushable ribs 226 provided at the outside of the opening edge portion 130A within a range in which the advantageous effects of the above embodiment are obtained.

Explanation has been given of an exemplary embodiment of the present invention, however the present invention is not limited thereby, and obviously it is possible to implement various changes other than those described above within a range not departing from the spirit of the present invention.

What is claimed is:

1. A webbing take-up device comprising:
   a spool that takes up webbing which is applied to an occupant, and that rotates in a pull-out direction by pulling out the webbing;
   a lock section that restricts rotation of the spool in the pull-out direction at least one of at a time when a vehicle suddenly decelerates or a time when the spool is rotated suddenly in the pull-out direction;
   a force limiter mechanism that, when the lock section restricts rotation of the spool in the pull-out direction, permits rotation of the spool in the pull-out direction at a force limiter load or greater;
   a pawl that is configured to be capable of being disposed in a first position and a second position so as to switch a load value of the force limiter load;
   a body that includes a flow path through which a gas generated by actuation of a gas generator flows;
   a cylinder that is connected to the flow path of the body;
   a piston that is housed inside the cylinder, and that moves along the cylinder by receiving a pressure of the gas to move the pawl from the first position to the second position;
   a sheet that is disposed at an opposite side of the cylinder with respect to the body, and that covers the cylinder by being attached to the body;

a support plate that is attached to the body in a state in which the cylinder and the sheet are disposed between the support plate and the body; and a rib that is provided between the sheet and the support plate and is provided at an opposite side of the sheet with respect to the cylinder, and that presses the cylinder via the sheet towards the body side due to the support plate being attached to the body, wherein the rib is integrally formed at the sheet, and a portion of the rib is deformed due to the support plate being attached to the body.

2. The webbing take-up device of claim 1, wherein:

the cylinder is disposed inside a housing groove provided at the body; and the rib is provided at an inner side of an opening edge portion of the housing groove in a plan view.

3. The webbing take-up device of claim 2, wherein:

a member at which the rib is provided is formed with a receiving surface that receives a pressing force of the cylinder which attempts to move by receiving the pressure of the gas; and the rib is disposed inside an indentation portion which is provided so as to indent with respect to the receiving surface.

4. The webbing take-up device of claim 1, wherein:

a member at which the rib is provided is formed with a receiving surface that receives a pressing force of the cylinder which attempts to move by receiving the pressure of the gas; and the rib is disposed inside an indentation portion which is provided so as to indent with respect to the receiving surface.

5. The webbing take-up device of claim 1, wherein:

a tip end portion of the rib protrudes towards the support plate side, and the deformed tip end portion of the rib abuts the support plate in a state in which the support plate is attached to the body.

6. The webbing take-up device of claim 5, wherein:

the indentation portion indents towards the cylinder side, a base end portion of the rib is provided at a bottom face of the indentation portion, and the tip end portion of the rib is protruded towards the support plate side further than an opening of the indentation portion.

* * * * *